Oct. 4, 1932.  C. W. WEISS  1,881,154
POWER TRANSMISSION DEVICE
Filed May 22, 1931  2 Sheets-Sheet 1
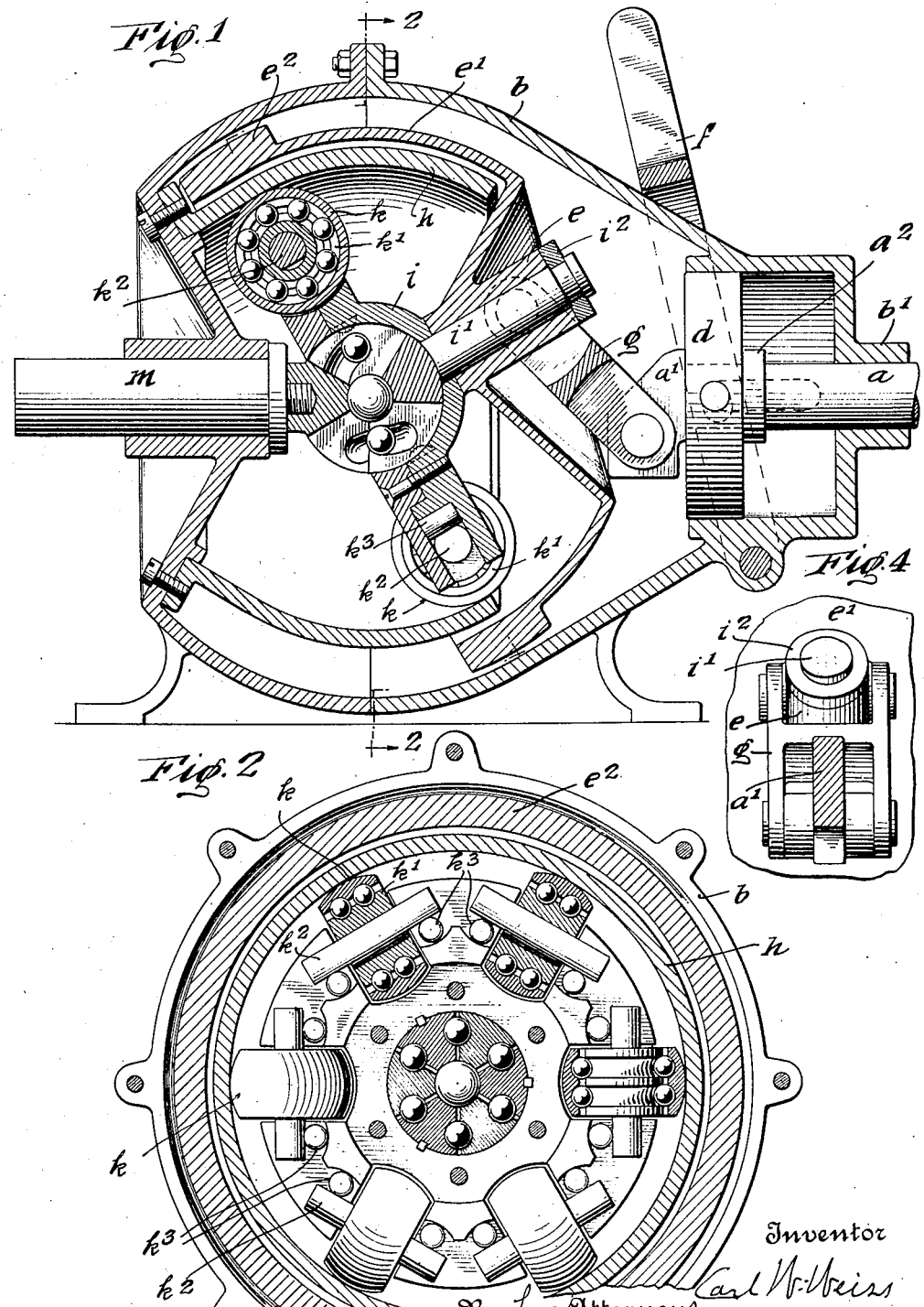

Oct. 4, 1932. C. W. WEISS 1,881,154
POWER TRANSMISSION DEVICE
Filed May 22, 1931 2 Sheets-Sheet 2

Patented Oct. 4, 1932

1,881,154

UNITED STATES PATENT OFFICE

CARL W. WEISS, OF BROOKLYN, NEW YORK

POWER TRANSMISSION DEVICE

Application filed May 22, 1931. Serial No. 539,251.

This invention relates to power transmission devices of the character of that shown in Letters Patent of the United States, No. 1,146,982, dated July 20, 1915, in which power is transmitted at variable speeds through the nutations of a mutor, the angular position of which with respect to a cooperating spherical surface can be varied at will. The operation at high speeds of power transmitting devices as shown in said patent developed a tendency to set up vibration, due to the inertia of the oscillating or nutating member. Vibration due to lack of balance in other respects could be overcome largely by counterweighting, but it was not found practicable, prior to the development of the present invention, to balance the nutating member in such manner as to eliminate vibration. In accordance with the present invention, however, there is provided a balancing body, preferably in the form of a wheel or annulus, which is mounted concentrically with the mutor, is shifted in relative angular position with the mutor, and is rotated with the driving shaft and therefore in timed relation with the nutations of the mutor. The rotation of the balancing body sets up gyroscopic force in a direction opposite to the force of inertia of the nutating mutor, and as the magnitude of the forces, centrifugal, inertia and gyroscopic, is a function of the angle of nutation, balance of the structure at any angle assures balance at all possible angles of nutation. The invention will be more fully explained hereinafter with reference to the accompanying drawings in which it is illustrated, and in which:

Figure 1 is a view partly in longitudinal central section and partly in elevation of one form of the transmission device which has embodied therein the present improvement.

Figure 2 is a view in sectional elevation, the plane of section being indicated by the line 2—2 of Figure 1.

Figure 4 is a detail view of the connection between the link and the balancing body.

In the embodiment of the invention illustrated the driving part or shaft $a$ is shown as mounted for rotation and for longitudinal movement in a suitable bearing $b^1$ in a casing $b$. A collar $d$ mounted loosely on the shaft $a$ between the head $a^1$ of the shaft and a fixed collar $a^2$ is engaged by a forked lever $f$ so that the shaft $a$ can be shifted longitudinally to change the angle of nutation of the mutor. On the head $a^1$ is pivoted eccentrically a forked link $g$, the other end of which is pivotally connected with a sleeve hub $e$ which supports a wheel $e^1$ having a heavy rim or annulus $e^2$. In the sleeve hub $e$, retained by a suitable collar $i^2$, is received freely a stud $i^1$ which is secured to the mutor $i$. The latter, in the construction illustrated, and as fully described in said Patent No. 1,146,982, supports rollers or rotatable gripping elements $k$ through the medium of roller bearings $k^1$ on shafts $k^2$ which are themselves supported on roller bearings $k^3$. The rollers or gripping elements $k$, as described in said patent, are free for limited movement in either direction on a tangent or chord of the arc of a circle the center of which coincides with the axis of rotation of the nutating body or mutor, movement of the roller toward one side or the other, from a middle position, increasing slightly the radial distance of the surface of the rollers from the axis of rotation of the mutor and from the center of the spherical cooperating member $h$. The mutor is thus supported so as to have a free nutating movement in the direction of rotation of the driver $a$ and to have, against the cooperating spherical bearing member $h$, points of contact which, though constantly changing with the nutating movement of the mutor and with the rotating movement, are points of resistance against which the force, or one component of the force, which is transmitted from the driver, reacts. It will be understood that the angle of nutation of the mutor is varied at will with the angle of rotation of the balancing body $e^2$, through the shifting of the head $a^1$ of the driver $a$ longitudinally in one direction or the other.

In Figure 1 of the drawings the mutor and the balancing body are shown in a plane at about 45° from the plane which passes through the center of the transmission device at a right angle to the axis of the shaft $a$.

The mutor $i$ is connected through a universal joint, preferably a joint of constant angular velocity, such as that shown in Letters Patent of the United States No. 1,522,351, dated January 6, 1925, with a driven part or shaft $m$.

Figure 3:
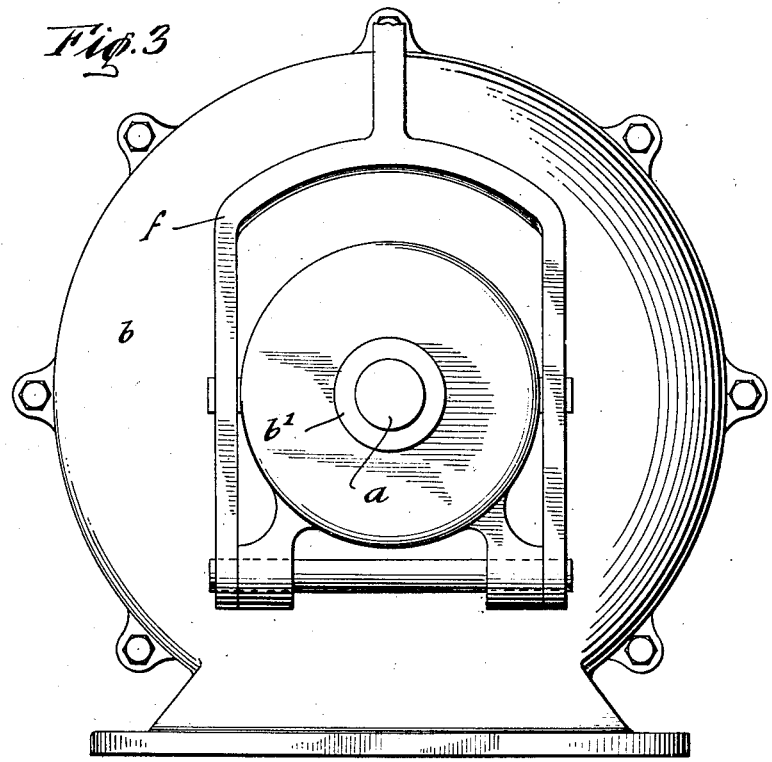
Figure 3 is an end elevation as seen from the right hand in Figure 1.
Figure 5:
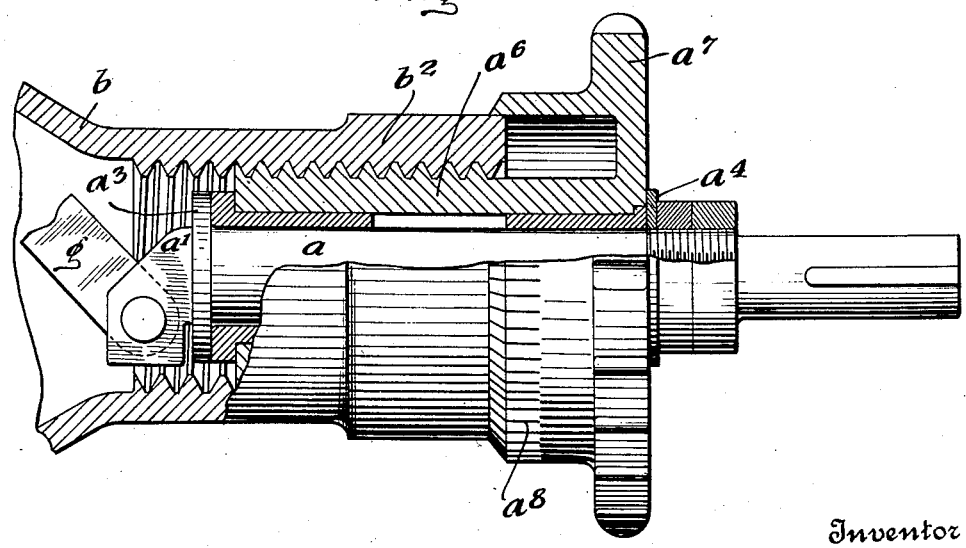
Figure 5 is a detail view in sectional elevation illustrating the application of a micrometer shifting device in place of the lever shifting device shown in Figures 1 and 3.

As devices of this character are sometimes employed where great nicety of speed variation as between the driving member and the driven member is desirable there is shown in Figure 5 a micrometer device for varying the relative angular position of the mutor. In this micrometer device the link $g$ is pivoted eccentrically on the head $a^1$ of the driving shaft $a$, which is longitudinally movable as before. The shaft receives, between a fixed collar $a^3$ and an adjustable collar $a^4$, a threaded sleeve $a^6$ received in a threaded portion $b^2$ of the casing $b$ and provided with a knurled adjusting ring $a^7$ and a scale $a^8$.

The mutor $i$ is supported by the gripping elements $k$ in the fixed, cooperating spherical member $h$. The stud $i^1$ of the mutor is received within the hub $e$ of the wheel $e^1$ with its heavy rim or annulus $e^2$, the stud and hub being capable of relative rotation. The hub $e$ is connected through the link $g$ with the head $a^1$ of the driving shaft $a$, the connection of the link with the driving shaft being eccentric with respect to the axis of the shaft. The mutor is not itself rotated with the rotation of the shaft $a$, since the hub $e$ and stud $i^1$ are capable of relative rotation. The mutor, however, receives a movement of nutation from the shaft $a$, the gripping elements $k$ moving in contact with the spherical cooperating member $h$. Thereby the mutor acquires a movement of rotation about the axis of its stud $i^1$ and through the universal joint which is clearly shown in Figure 1 of the drawings. Such movement of rotation of the mutor about the axis of the stud $i^1$ is transmitted to the driven shaft $m$. The rate of such rotation of the mutor and of the driven part is determined by the angular position of the mutor, being zero when the axis of the shaft $i^1$ is in line with the axis of the shaft $a$ and increasing as the mutor is moved toward the angular position shown in Figure 1 in which the rate of rotation of the mutor and therefore of the driven shaft $m$ is the maximum in the construction shown. It will be seen, however, that the balancing body $e^2$ is rotated with the driving shaft $a$ in all positions of the mutor, but is shifted in angular position with the mutor. When the parts are in zero position, that is, when the driving shaft $a$ is in its extreme right hand position and the axis of the stud $i^1$ is in line with the axis of the shaft $a$ the balancing body rotates freely about the axis of the device at the speed of rotation of the shaft $a$ in a position at right angles to the shaft axis. In this position of the parts the mutor is at rest, having no movement of nutation. As the shaft $a$ is moved to the left hand in Figure 1 toward the position indicated in Figure 1, which may be taken as the extreme position practicable for the construction illustrated, the mutor $i$ is caused to nutate about the common center and to effect, through the universal joint, rotation of the driven shaft $m$. At the same time the balancing body $e^2$ is moved to a corresponding angular position, while continuing to rotate about the axis of the device. Under these conditions, the centrifugal force developed in the balancing body tends to move it toward its initial position in a plane at 90° to the axis of rotation and so creates a couple with the moment of magnitude equal to and in a direction opposite to the moment of inertia of the nutating member or mutor. The rotation of the mutor on its axis, which is the axis of the stud shaft $i^1$, when such axis is at an angle to the axis of the driving shaft, sets up a gyroscopic force in a direction opposite to the force of inertia of movement of nutation of the mutor and indicates a reduction of weight of the balancing body. It will be seen that as the magnitude of the forces, centrifugal, inertia and gyroscopic, involved in the operation of this device, is at all times a function of the angle of nutation, balancing the structure at any angle, assures balance of the structure at all possible angles of nutation.

I claim as my invention:

1. A power transmission device comprising a rotatable mutor, a cooperating body concentric with the mutor, one of said parts having a spherical bearing surface and the other of said parts having gripping elements to cooperate with the spherical bearing surface, a balancing body relatively rotatable with respect to the mutor, means to vary the relative angular position of the mutor and of the cooperating body and of the balancing body, and driving means for one of said first named parts and for said balancing body.

2. A power transmission device comprising a rotatable mutor having gripping elements, a cooperating body concentric with the mutor and having a spherical bearing surface to cooperate with the gripping elements of the mutor, a balancing body concentric with the mutor and rotatable independently thereof, and means to vary the angular position of the mutor and of the balancing body and to rotate the balancing body.

3. A power transmission device comprising a rotatable mutor having gripping elements, a cooperating body concentric with the mutor and having a spherical bearing surface to cooperate with the gripping elements of the mutor, a wheel mounted on the axis of the mutor and rotatable independently thereof, and means to vary the angular position of the mutor and of the balancing body and to rotate the balancing body.

4. A power transmission device comprising a rotatable mutor, a cooperating body concentric with the mutor, a stud axle on the mutor, a wheel having a hub sleeve mounted on the stud axle and relatively rotatable with respect to the mutor, and means operatively connected to the hub sleeve of the wheel to rotate the wheel and to vary the angular position of the mutor and of the wheel.

5. A power transmission device comprising a rotatable mutor, a cooperating body concentric with the mutor, a stud axle on the mutor, a wheel having a hub sleeve mounted on the stud axle and relatively rotatable with respect to the mutor, a driving shaft movable longitudinally, and a link pivoted to the driving shaft eccentrically at one end and pivotally connected to the hub sleeve at the other end.

6. A power transmission device comprising a mutor, means to impart to the mutor a movement of nutation and a consequent movement of rotation on its own axis, means to impart the movement of rotation of the mutor on its own axis to the driven part, and a wheel mounted concentrically on the mutor and rotatable independently thereof, said wheel having a movement of nutation with the mutor.

This specification signed this 15th day of May, A. D. 1931.

CARL W. WEISS.